United States Patent

[11] 3,601,790

| [72] | Inventor | John H. Sasseen |
| | | Houston, Tex. |
| [21] | Appl. No. | 855,008 |
| [22] | Filed | Sept. 3, 1969 |
| [45] | Patented | Aug. 24, 1971 |
| [73] | Assignee | Esso Production Research Company |

[54] COMMON DEPTH POINT SEISMIC PROSPECTING
2 Claims, 5 Drawing Figs.

[52] U.S. Cl. ................................................. 340/15.5
[51] Int. Cl. ................................................. CP, 181/.5 P
 G01v 1/16
[50] Field of Search ........................................ 181/.5;
 340/15.5

[56] References Cited
UNITED STATES PATENTS
2,232,613 2/1941 Klipsch..................... 181/.5
2,810,444 10/1957 Dyk et al..................... 181/.5
3,412,373 11/1968 Ellis........................... 340/15.5
3,431,999 3/1969 Glazier........................ 340/15.5

Primary Examiner—Rodney D. Bennett, Jr.
Assistant Examiner—N. Moskowitz
Attorneys—James A. Reilly, John B. Davidson, Lewis H. Eatherton, James E. Gilchrist, Robert L. Graham and James E. Reed

ABSTRACT: Common depth point seismic prospecting is accomplished by sequentially producing seismic waves at transmitting locations spaced apart the distance A, and detecting resulting seismic waves at a first plurality of detecting locations along the traverse spaced apart a distance A from the transmitting location corresponding thereto and a second plurality of transmitting locations spaced apart a distance 2A, the second plurality of detecting locations beginning at the end of the first plurality.

PATENTED AUG 24 1971
3,601,790
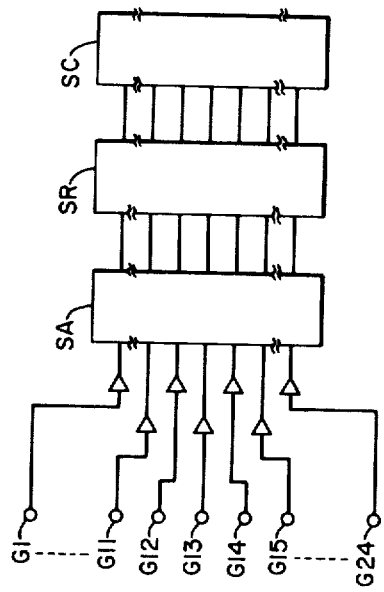
JOHN H. SASSEEN
INVENTOR.
BY John B. Davidson
ATTORNEY

COMMON DEPTH POINT SEISMIC PROSPECTING

BACKGROUND OF THE INVENTION

This invention relates to an improved technique for common depth point seismic prospecting and more particularly to a technique for delineating relatively shallow seismic wave reflecting earth formations when using the common depth point seismic technique.

The seismic technique of geophysical prospecting is well known. In accordance with the technique a seismic disturbance is initiated at or near the earth's surface and seismic waves resulting therefrom are detected at a plurality of locations spaced apart from the location of the seismic disturbance along a traverse extending away from the location of the seismic disturbance to produce electrical signals indicative of the amplitude, frequency and phase of the waves. The electrical signals resulting from detecting the seismic waves are recorded to form a seismogram. From the seismogram it is possible to glean information relative to the geologic structure of the earth's subsurface.

The seismogram formed as a result of the seismic disturbance is made up of events resulting from seismic waves having been reflected, refracted, and diffracted by the layers of the earth's subsurface, along with seismic waves produced by noise such as the wind, vehicles, and general ground unrest. One of the problems of the geophysicist is to distinguish the desired seismic wave events, usually produced by reflected seismic waves, from noise events, which may be generally defined as seismic waves produced from extraneous sources or resulting from seismic waves that are not reflected from earth formation interfaces. In order to improve the seismic signal-to-noise ratio on a seismogram, in recent years it has become customary to use the so-called common depth point seismic technique. In accordance with this technique, the locations at which seismic waves or disturbances are produced and the locations at which the resulting seismic waves are detected are spaced along a traverse in such a manner that traces resulting from different seismic disturbances will contain events reflected from common reflection points, or, as they are often termed, common depth points. Traces having events resulting from reflections from common reflecting points are added in such a manner as to add together the common reflection point events and to discriminate against other events on the traces. The term "fold" is used to designate the number of traces having common reflection point events that are summed to produce a single trace. By increasing the number of added traces having common reflection point events (commonly known as increasing the "fold"), the signal-to-noise ratio of the summed traces is increased. The general technique is described in the following U.S. Pat. Nos. 3,353,152; 3,105,568; 3,217,828; 3,352,377.

One of the difficulties with the common depth point, or roll-along, seismic technique as practiced heretofore has been that it has been very difficult to delineate shallow subsurface formations from composite seismograms obtained by using the technique. In order to obtain cancellation of noise events, it is necessary to sum together four to 12 or more traces. The ray path geometry involved in the roll-along technique results in cancellation of near-surface reflections as well as noise. The seismic waves become refracted rather than reflected because of the long spread lengths involved in the ordinary roll-along technique as it is customarily practiced. Since the near-surface geology is extremely important in seismic interpretation, manifestly it is desirable, if not essential, to delineate the near-surface stratigraphy as well as the deep stratigraphy.

SUMMARY OF THE INVENTION

In accordance with the present invention, there are located along a traverse a multiplicity of evenly spaced seismic wave disturbance/detecting locations. A seismic disturbance is initiated at one of the locations. The resulting seismic waves are detected at a first plurality of such locations immediately adjacent the disturbance location and spaced from the disturbance location and from each other by a distance A. Beginning with the last of such first detection locations, the seismic waves are detected at a second plurality of detection locations spaced from the last of the first plurality and from each other by a distance 2A. The disturbance location is then moved a distance 2A along the traverse. The first two geophone locations nearest the disturbance location are dropped and added to the other end of the array of first geophone locations. Detection locations in the second series of such locations that coincide with one or more of the geophone locations added in the step immediately preceding preferably are dropped from one end of the second series of detection locations and added to the other end thereof. A seismic disturbance is initiated at the second disturbance locations, detected by the new array of geophone locations, and recorded. This technique is repeated as many times as necessary along the seismic traverse. Subsequently, seismic traces or records produced as a result of the technique that have common depth point events thereon are summed to form a seismic record wherein reflections are enhanced and noise events are canceled. As a result of the closer geophone spacing near the seismic disturbance locations, it will be found that the near-surface events on the records are enhanced along with the reflection events produced as a result of seismic wave reflections from deeper interfaces.

Objects and features of the invention not apparent from the above discussion will become evident upon consideration of the following detailed description of the invention in connection with the accompanying drawings, which description is to be taken in an illustrative sense rather than in a limiting or restrictive sense.

BRIEF DESCRIPTION OF THE DRAWINGS

In the drawings: FIGS. 1A, 1B, and 1C illustrate successive positions of seismic disturbance locations and geophones along a seismic traverse according to one aspect of the invention; FIG. 2 is a common reflection point diagram illustrating the number of folds, or the number of traces that may be summed, corresponding to each seismic reflection point along a traverse in connection with the invention; and FIG. 3 is a block schematic diagram of apparatuses for recording and processing.

As is well known to the art, the common depth point or common reflection point technique may be practiced using either a split spread (wherein geophones are positioned along a traverse on both sides of a given seismic disturbance location) or according to the end-shooting technique (wherein the seismic disturbance location is located at one end or the other of a linear spread of geophone locations). The split-spread technique is described in U.S. Pat. No. 3,217,828—Mendenhall—and the end-shooting technique is described in U.S. Pat. Nos. 3,105,568—Jolly—and 3,240,286—Musgrave. For the sake of convenience, the invention will be described in accordance with the latter technique although it is to be understood that the split-spread technique may also be used.

DESCRIPTION OF THE PREFERRED EMBODIMENT

With reference now to FIGS. 1A, 1B, and 1C, there is illustrated in each figure an array of seismic disturbance/detection locations identified by the reference numerals 1, 2, 3, 4...24. Only individual ones of the locations are so identified. The distance between adjacent locations is not critical, and may be any of the distances customarily used to define shallow structures, such, for example, as 110 feet. This distance is designated in the drawing as distance A. The distance should be substantially the same between all adjacent pairs of locations. The distance between the initial seismic disturbance location S1 and the location 1 is also equal to the distance A.

Initially, the seismic disturbance location S1 and the geophones G1, G2, G3...G24 are positioned as illustrated in FIG. 1A along the seismic traverse. Geophones G1 through G12 are positioned at locations 1 through 12 and thus are separated by the distance A. Geophones G12, G13, G14...G24, however, are positioned at locations 12, 14, 16, 18, 20...36 and thus adjacent geophones are separated by the distance 2A. In addition, geophone G13 is separated by the distance 2A from geophone 12. While only one geophone is referred to for the sake of simplicity, it is manifest that a cluster of geophones may be positioned at each of the detecting locations and connected together to produce one output signal. This is standard practice in the art and will not be further discussed herein. As illustrated in FIG. 3, the geophone output signals are individually connected to seismic amplifiers SA and the output signals of the amplifiers SA are recorded by seismic recorder SR to form a seismic record. Alternatively, as described in U.S. Pat. No. 3,315,223—Hibbard et al., U.S. Pat. No. 3,314,957—Foote et al., and U.S. Pat. No. 3,241,100—Loofbourrow et al., the seismic signals, either before or after amplification, can be multiplexed and recorded in digital form. Under any circumstances, the form in which the signals are recorded should be such that the signals are reproducible at some desired time after recordation thereof. At such time, the signals are reproduced and are applied to a suitable trace compositing apparatus, a suitably programmed digital computer, or a device such as is described in U.S. Pat. Nos. 3,289,153 and 3,206,720, and the summed signals are applied to a recorder for recording such signals in permanent form. The latter recorder may be an apparatus such as is described in U.S. Pat. No. 3,383,701 or, if the summed signal is in digital form, a device such as is described in U.S. Pat. No. 3,158,433. The trace compositing and recording apparatus is designated in FIG. 3 by the reference designation SC.

Initially, a seismic observation is performed by activating the seismic wave generator S1, which may be either a charge of dynamite, a vibrator, a gas exploder device, or other apparatus for generating seismic waves, and recording the resulting seismic waves with the geophones in the positions indicated in FIG. 1A. The seismic wave generating location is now moved to location 2, as illustrated in FIG. 1B. Location 2, as can be noted in FIG. 1, is a distance 2A removed from the initial location of the seismic wave generating apparatus. The entire seismic array may be moved a distance 2A to the right as illustrated, in the direction indicated by the arrow Z, or the geophones initially at locations 1 and 2 can be moved to locations 13 and 14 while the geophone formerly at location 14 can be moved to location 38. With the geophones and the seismic wave generating apparatus in the relative locations illustrated in FIG. 1B, another seismic wave observation is performed by activating the seismic wave generator and recording the seismic waves produced thereby.

The seismic wave generating equipment is now positioned at location 4, as illustrated in FIG. 1C. Here again the entire array may be moved a distance 2A to the right as viewed, or geophones G3 and G4 can be moved to locations 15 and 16 while geophone G14 is moved to location 40. Another seismic observation is performed by activating the source S3 (assuming dynamite to be the source) and recording the signals produced by the geophones responsive to seismic waves impinging thereon. This procedure is repeated many times, each time moving the seismic wave generating location a distance 2A to the right and suitably repositioning the geophones in the array so that the first 12 geophones are located so that adjacent geophones are separated by a distance A and so that geophones G13 through G24 are located so that adjacent geophones are separated by a distance 2A, all as illustrated in FIGS. 1A, 1B and 1C.

Refer now to the common reflection point chart illustrated in FIG. 2. This chart illustrates the projection to the earth's surface reflection point locations on a planer, horizontal seismic wave reflecting horizon relative to seismic wave disturbance and geophone locations 1-24 (indicated by the vertical lines from reference numerals 1-24), assuming that a series of nine seismic wave observations are performed in the manner described above. As is well known, each reflecting point on a planer, substantially horizontal reflecting horizon will be located approximately halfway between the location of the seismic wave generating point and a detecting location at which the reflected seismic waves are located. Thus, assuming a distance of 150 feet between the initial disturbing location and the first geophone, reflected seismic waves will be located at a depth point beneath a location halfway between the disturbance location and the geophone, or 75 feet. The next adjacent depth point on the reflecting horizon will be beneath a location halfway between the disturbance location and the second geophone station, or directly beneath the first geophone station. Thus the first 12 depth points along the traverse will be spaced 75 feet apart while the last 12 reflection points on any reflecting horizon will be spaced 150 feet apart, assuming that the distance 2A equals 300 feet. In the depth point diagram of FIG. 2, the seismic disturbance numbers are noted in the first column and the dots on the same line as the disturbance number represent the locations of the depth points relative to the disturbance geophone locations. It will be noted that the depth point locations move to the right by a distance 2A as the disturbance location is moved to the right by a distance 2A. Using the depth point diagram, the signals that are to be added together in order to enhance reflection events and to cancel extraneous events on the seismic records can be readily determined. For example, under the geophone location 7 it is to be noted that there are four dots. These dots indicate that the following traces produced by observations 1 through 4 are to be summed: geophone 13 in the first observation, geophone 10 in the second observation, geophone 6 in the third observation, and geophone 2 in the fourth observation. Thus, beneath geophone disturbance location 7, the fold, or number of signals that can be summed, is four. The most interesting part of the reflection point diagram is between disturbance geophone locations 14 and 17. It is manifest that more than nine observations will be conducted in practice along a traverse. Conventionally, many hundreds, or even thousands, of such observations will be conducted. The number of fold at each end of a traverse will taper off as illustrated in FIG. 2 but the greatest part of the traverse will have a fold coverage as illustrated between geophone locations 14 and 17. As is apparent from FIG. 2, on alternate locations between locations 14 and 17, ninefold CDP coverage is obtained. On the other alternate locations, threefold CDP coverage is obtained. This is advantageous for the following reason. In practice, for deep reflections, the greater number in the fold, the greater will be the signal-to-noise ratio. Inasmuch as the signals for deep reflections are quite small, a high signal-to-noise ratio is mandatory; however, it is not important that the geophones be spaced closely together, spacings of 300 to 600 feet being acceptable. For shallow reflections it is imperative that the spacing between adjacent geophones be kept fairly small. It is not imperative, however, that the fold be great inasmuch as the shallow reflectors return relatively large amplitude signals so that lower signal-to-noise ratio is quite tolerable. Therefore, by spacing half of the geophones in the spread a distance A and the outer half of the geophones a distance 2A the signal-to-noise ratio is increased by 50 percent with no increase in the number of shot holes, whereas shallow reflection information is obtainable which is useful and interpretable even though the fold is reduced at the alternate geophone locations. Therefore, much better deep reflection information can be obtained, and significantly improved shallow information can be obtained with no increase in the effort required to survey the entire seismic traverse.

Although the embodiments of the invention disclosed in the preceding specification are preferred, other modifications will be apparent to those skilled in the art which do not depart from the scope of the broadest aspects of the present invention.

I claim:

1. In the method of reflection seismography wherein there are produced a plurality of seismic records having events thereon resulting from seismic waves reflected from common reflecting locations on subsurface reflecting horizons and wherein such seismic records are summed to enhance reflection events, the improved method of producing such seismic records comprising:

a. locating along a seismic traverse a plurality of seismic wave transmitting and detecting stations evenly spaced apart by a distance A;
b. producing a first seismic disturbance at a first transmitting location located on a seismic traverse;
c. detecting resulting seismic waves at a first plurality of first detecting locations linearly spaced apart a distance A along said traverse beginning at a distance A from said transmitting location, and at a second detecting location spaced apart a distance 2A along said traverse, said second detecting locations being located on the opposite side of said first detecting locations from said first transmitting location;
d. recording the detected signals to produce a first seismic record;
e. producing another seismic disturbance at another transmitting location spaced a distance 2A from the preceding transmitting location;
f. detecting seismic waves resulting from another seismic disturbance at detecting locations corresponding to said first and second detecting locations but moved a distance 2A in the direction of said second seismic disturbance location from said first transmitting location recording the detected signal to produce another seismic record; and
g. repetitively repeating steps d, e, and f.

2. The method of claim 1 wherein the number of first detecting locations is equal to the number of second detecting locations.